Patented Dec. 17, 1935

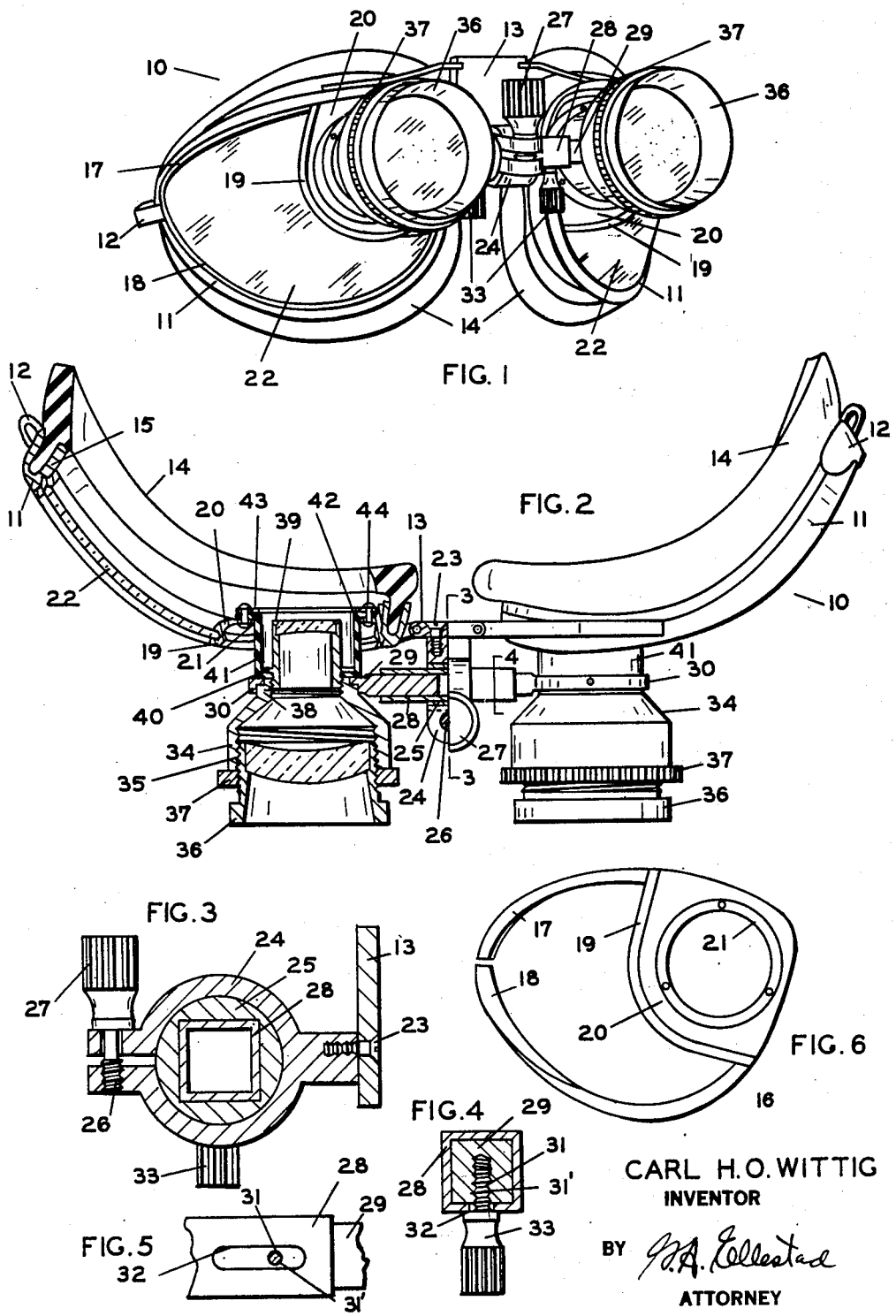
Dec. 17, 1935.  C. H. O. WITTIG  2,024,322
TELESCOPE GOGGLES
Filed Sept. 29, 1934  2 Sheets-Sheet 1
CARL H.O. WITTIG
INVENTOR
ATTORNEY

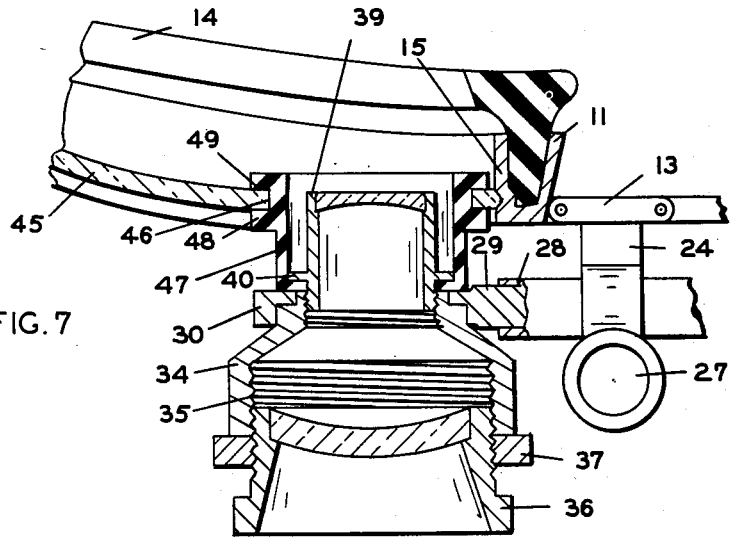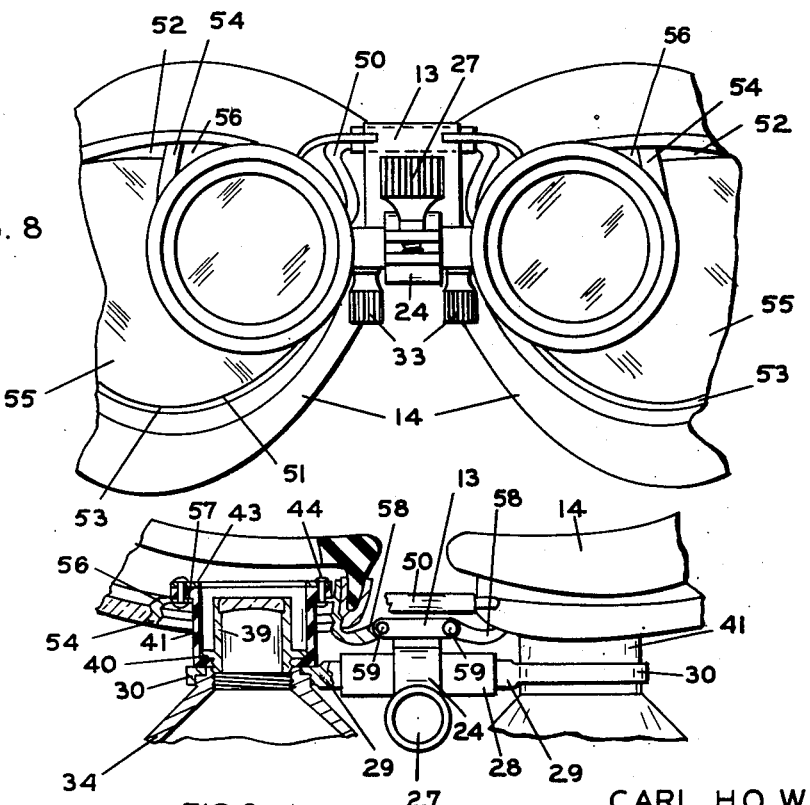

2,024,322

UNITED STATES PATENT OFFICE 2,024,322

TELESCOPE GOGGLES

Carl H. O. Wittig, Irondequoit, N. Y., assignor to Bausch & Lomb Optical Company, Rochester, N. Y., a corporation of New York Application September 29, 1934, Serial No. 746,201

15 Claims. (Cl. 88—41)

This invention relates to optical devices and more particularly has reference to telescope goggles comprising telescope units mounted in a goggle frame whereby the wearer is selectively provided with vision through the telescope units or through the goggle lenses.

This invention is an improvement upon the telescopic goggles described and claimed in Patent 1,892,444 of December 27, 1932 to Carl L. Bausch. In that patent the telescopes are fastened in fixed relation to the goggle lenses and hence there is no provision for adjustment for interpupillary distance or inclination.

One of the objects of my invention is to provide an improved and adjustable telescope goggle. Another object is to provide an improved means for mounting a telescope upon a goggle frame. A further object is to provide an improved connection between the telescope and the goggle lens. A further object is to provide means whereby a commercial type goggle can be readily converted into telescope goggles. These and other objects and advantages reside in certain novel features of construction, arrangement and combination of parts as will hereinafter be more fully set forth and pointed out in the appended claims.

In the drawings:

Figure 1 is a perspective view of a pair of goggles made in accordance with my invention.

Fig. 2 is a top view of same with one side in horizontal section.

Fig. 3 is a sectional view taken on line 3—3 of Fig. 2.

Fig. 4 is a sectional view taken on line 4—4 of Fig. 2.

Fig. 5 is a detail view of the telescope supporting arm connection.

Fig. 6 is a view of an auxiliary goggle lens rim.

Fig. 7 is a sectional view of one modification according to my invention.

Fig. 8 is a front elevation of a further modification according to my invention.

Fig. 9 is a top view of the modification shown in Fig. 8 with parts in horizontal section.

One embodiment of my invention is shown in the drawings wherein 10 indicates, generally, a pair of goggles such as are worn by aviators, autoists, and the like. This goggle has two eye units each comprising a substantially oval-shaped, split frame member 11, the adjacent ends of which are secured by means of a suitable latch 12. The two eye units are pivoted to the ends of a bracket 13 which forms the bridge of the goggles and each frame member 11 carries a sponge rubber pad 14.

The frame member 11 is provided with a grooved portion 15 in which is mounted the oval-shaped member 16 shown in Fig. 6. The member 16 comprises three rim portions 17, 18 and 19 which are secured, as by soldering, for example, to a plate 20 having an aperture 21. The rim portions 17, 18 and 19 have inner grooves in which is mounted the lens 22, which, of course, is cut away to provide for the plate member 20 as shown in Fig. 1.

Fastened to the bracket 13 by means of screws 23 is a split ring 24 in which the cylindrical tubular member 25 is rotatably mounted. A screw 26 having a knurled head 27 serves to bring the ends of the split ring 24 together to clamp the tubular member 25 against rotation. A square tubular member 28 is fixed within the tubular member 25 and extends laterally to receive the square rods 29. Each rod 29 terminates in a ring 30 and has a threaded hole 31 to receive a screw 31' which extends through a slot 32 near the end of the tubular member 28 and terminates in a knurled head 33.

Each ring 30 carries a Galilean telescope comprising a tube 34 provided with a threaded section 35 for receiving the positive lens cell 36 which is locked into position by a locking ring 37. The tube 34 has a second threaded section 38 for receiving the negative lens cell 39. A shoulder 40 is formed on the negative lens cell 39 which serves to clamp the telescope to the ring 30 and also serves to clamp a flexible rubber tube 41 to the telescope.

The rubber tube 41 extends rearwardly from the telescope, through the aperture 21 in the plate 20, and terminates in an outwardly extending flange 42. This flange 42 is clamped to the plate 20 by means of a ring 43 and pins or rivets 44 which extend through the ring 43, the flange 42 and the plate 20.

In order to adjust the telescopes to any desired vertical angle the screw 26 is loosened and the telescopes turned to the desired angle, and the screw 26 is then tightened to clamp them in that position. The telescopes can also be moved toward and from each other and clamped in position by the screws 31'. This last adjustment permits accommodation for different interpupillary distances. Regardless of the adjustment however, the flexible rubber tube 41 maintains a light tight and wind tight connection between the goggle and the telescope.

In the modification shown in Fig. 7, the goggle structure, the telescopes and the telescope supporting means are the same but the oval-shaped member 16 is omitted. The lens 45 is carried by the grooved portion 15 of the frame member 11 and is formed with an aperture 46. The flexible rubber tube 47 extends through the aperture 46 and has two parallel flanges 48 and 49 for gripping the opposite faces of the lens 45 at the aperture 46.

In the modification shown in Figs. 8 and 9 the two eye units each comprise a split frame member 11 carrying a sponge rubber pad 14. The frame members 11 are pivotally connected by a bridge 50.

The frame members 11 are provided with a grooved portion 15 in which is mounted an oval-shaped member 51 similar to that shown in Fig. 6. The member 51 comprises the rim portions 52, 53 and 54 which are grooved to carry a lens 55. A plate 56 having an aperture 57 is secured to the rim portions 52, 53 and 54 and carries an extension 58 to which a bracket 13 is pivoted at 59. The split ring 24 is secured to this bracket and the adjustable telescope mounting is identical with that of the preceding modifications. The flexible rubber tube 41 extends through the aperture 57 and is fastened to the plate 56 by a ring 43 and pins or rivets 44 as in the modification shown in Figs. 1 and 2.

This last form of my invention is applicable to any type of standard goggle as it is independent of the form of bridge used in the goggle. The oval-shaped members 51 are the same size and shape as the standard goggle lens and the bracket 13 is carried by the oval-shaped members.

It is thus apparent that I attain the objects of my invention and provide a new and improved telescope goggle in which the telescopes are adjustably carried by the goggle frame and a light tight and wind tight connection is maintained between each telescope and its adjacent lens. Obviously various modifications can be made without departing from the scope of my invention.

I claim:

1. In a device of the character described, a goggle frame, a pair of telescope members, means for adjustably mounting said telescope members on said frame, goggle lenses in said frame, and means including a flexible tube for connecting said telescope members to said lenses.

2. In a device of the character described, a frame, a pair of optical systems adjustably carried by said frame, a pair of goggle lenses mounted in said frame and flexible means for connecting said optical systems to said lenses, a part of said lenses lying beyond said means to provide a separate field of view.

3. In a pair of telescope goggles, a bracket, a split ring mounted upon said bracket, a tubular member rotatably mounted in said split ring, means for clamping said member in a desired position, a pair of rods slidably mounted in said tubular member, means for holding said rods against rotation in said member, means for clamping said rods in a desired position and a telescope carried by each of said rods.

4. In a pair of goggles a frame, a rim secured in said frame, means on said rim for holding a goggle lens, a plate carried by said rim, said plate having an opening, an optical system, means for mounting said optical system in adjustable relation to said plate, and flexible means for connecting said optical system to said plate at said aperture.

5. In a device of the character described, a pair of eye units, each of said units comprising a frame, a metallic rim secured in said frame, and a plate carried by said rim, said plate having an opening; a bridge connecting said eye units, an optical system for each eye unit, means for adjustably mounting said optical systems on said bridge and flexible means for connecting each optical system to the plate of its respective eye unit.

6. In a pair of telescope goggles, two eye units each comprising a frame and an apertured lens in each frame; a bridge connecting said eye units, an optical system for each eye unit, means for adjustably mounting each optical system on said bridge, and a flexible tube for connecting each optical system to its respective lens at said aperture.

7. In a device of the character described, two eye units each comprising a frame and an apertured lens in each frame; a bridge connecting said eye units, an optical system for each eye unit, means for adjustably mounting said optical systems on said bridge, a flexible tube fastened to each of said optical systems and extending rearwardly toward said apertured lenses, and means on each tube for gripping the adjacent lens at its aperture.

8. In a device of the character described, two eye units, a frame for each eye unit, a bridge for connecting said frames, a pair of metallic rims, one secured in each frame, an apertured plate carried by each rim, a supporting bracket between said eye units pivotally secured to both metallic rims, an optical system for each eye unit, means for adjustably mounting said optical systems upon said bracket, and flexible means for connecting each optical system to the adjacent apertured plate.

9. An insert for converting conventional goggles into telescope goggles comprising, a metallic rim for each eye unit, a bracket pivotally connecting said rims, a telescope for each eye unit and means for adjustably mounting said telescopes on said bracket.

10. An insert for converting conventional goggles into telescope goggles comprising, a metallic rim for each eye unit, an apertured plate carried by each rim, a bracket pivotally connecting said rims, a telescope for each eye unit, means for adjustably mounting said telescopes upon said bracket and flexible means for connecting each telescope to its adjacent apertured plate.

11. In a pair of telescope goggles two units each comprising an apertured lens, means for pivotally connecting said units, a telescope for each lens secured to said means and two flexible members each contacting the surface of one lens about its aperture and contacting the adjacent telescope to prevent the entry of air through said apertures.

12. In a pair of telescope goggles, two eye units each comprising a frame and an apertured lens in each frame, a bridge connecting said eye units, a telescope for each eye unit, means for mounting each telescope on said bridge and a flexible windproof member between each telescope and the adjacent lens to prevent the entry of air through the aperture.

13. In a pair of telescope goggles, a bridge, a lens member having an aperture therein, means for pivotally securing said lens member to said bridge, a telescope member secured to said bridge and having an end portion adapted to extend into the aperture in said lens member, and flexible means on one of said members adapted to form a wind-tight connection with said other member when said lens member and said telescope member are in operative relation.

14. In a pair of telescopic goggles a bridge, a lens pivotally connected to said bridge, said lens having an aperture therein, a telescope fixedly connected to said bridge and having an end portion adapted to enter the aperture in said lens, and a flexible member secured to said telescope and contacting the surface of said lens around said aperture.

15. In a device of the character described, two eye units each comprising a frame and an apertured lens in each frame, a bridge connecting said eye units, an optical system for each eye unit, means for mounting said optical systems on said bridge and a flexible member fastened to each of said optical systems extending rearwardly and engaging the surface of the adjacent lens outside of the aperture.

CARL H. O. WITTIG.